US012790106B2

(12) United States Patent
Käser

(10) Patent No.: US 12,790,106 B2
(45) Date of Patent: Nov. 10, 2026

(54) BOTTLE

(71) Applicant: BottlePlus AG, Aarau (CH)

(72) Inventor: Christian Käser, Zürich (CH)

(73) Assignee: Bottleplus AG, Aarau (CH)

( * ) Notice: Subject to any disclaimer, the term of this patent is extended or adjusted under 35 U.S.C. 154(b) by 392 days.

(21) Appl. No.: 18/035,676

(22) PCT Filed: Jan. 11, 2022

(86) PCT No.: PCT/IB2022/050167
§ 371 (c)(1),
(2) Date: May 5, 2023

(87) PCT Pub. No.: WO2022/157596
PCT Pub. Date: Jul. 28, 2022

(65) Prior Publication Data

US 2023/0406611 A1 Dec. 21, 2023

(30) Foreign Application Priority Data

Jan. 21, 2021 (CH) ....................................... 55/2021

(51) Int. Cl.
*B65D 85/73* (2006.01)
*B01F 23/2361* (2022.01)
(Continued)

(52) U.S. Cl.
CPC ........ *B65D 85/73* (2013.01); *B01F 23/23611* (2022.01); *B01F 23/237621* (2022.01);
(Continued)

(58) Field of Classification Search
CPC .. B01F 23/7621; B01F 35/602; B01F 23/235; B01F 23/2361; B01F 23/23611; B01F 23/2362; B65D 85/73; A23L 2/54
(Continued)

(56) References Cited

U.S. PATENT DOCUMENTS 334,159 A * 1/1886 Beretz ............... B01F 23/23123 222/394
486,225 A * 11/1892 Frings ............... B01F 23/23611 261/DIG. 7
(Continued)

FOREIGN PATENT DOCUMENTS

CH 712153 A1 8/2017
CN 105705223 A 6/2016
(Continued)

OTHER PUBLICATIONS

International Search Report and Written Opinion for PCT/IB202/050167 dated Apr. 22, 2022.
(Continued)

*Primary Examiner* — Michael N Orlando
(74) *Attorney, Agent, or Firm* — Fleit Intellectual Property Law; Paul D. Bianco; Stephen Bongini

(57) ABSTRACT

A bottle, in particular a reusable and refillable bottle for $CO_2$-containing drinks, which can be carbonated and stored in the bottle. A bottle with better usage properties is to be achieved. The bottle includes a closable liquid container with an adapter which is attached or flanged to the base of the liquid container and which contains a $CO_2$ tank.

19 Claims, 7 Drawing Sheets

(51) Int. Cl.

| | |
|---|---|
| ***B01F 23/237*** | (2022.01) |
| ***B01F 35/60*** | (2022.01) |
| ***B01F 101/14*** | (2022.01) |
| ***B65D 1/02*** | (2006.01) |
| ***B65D 41/04*** | (2006.01) |

(52) U.S. Cl.

CPC .......... *B01F 35/602* (2022.01); *B65D 1/0246* (2013.01); *B65D 1/0261* (2013.01); *B65D 41/0435* (2013.01); *B01F 2101/14* (2022.01)

(58) Field of Classification Search

USPC ..................... 99/323.1; 426/477; 261/DIG. 7

See application file for complete search history.

(56) References Cited

U.S. PATENT DOCUMENTS

| | | | | | |
|---|---|---|---|---|---|
| 565,922 | A * | 8/1896 | Prax | B01F 23/231 | 222/394 |
| 2,117,271 | A * | 5/1938 | Bowman | B67D 1/0456 | 261/DIG. 7 |
| 2,345,081 | A | 3/1944 | Ward | | |
| 4,481,986 | A * | 11/1984 | Meyers | B01F 23/2361 | 261/DIG. 7 |
| 4,548,828 | A * | 10/1985 | Meyers | B01F 33/5014 | 261/DIG. 7 |
| 5,182,084 | A * | 1/1993 | Plester | B01F 23/236 | 99/323.1 |
| 5,231,816 | A * | 8/1993 | Lynch | B65B 3/04 | 53/473 |
| 5,329,975 | A | 7/1994 | Heitel | | |
| 5,366,745 | A * | 11/1994 | Daden | B01F 23/23611 | 261/DIG. 7 |
| 5,620,725 | A * | 4/1997 | Jamieson | B65D 85/73 | 426/115 |
| 5,683,732 | A * | 11/1997 | Baxter | B65D 85/73 | 426/115 |
| 6,161,819 | A * | 12/2000 | Edwards | B67D 1/0412 | 261/DIG. 7 |
| 8,958,561 | B2 * | 2/2015 | Stroud | H04L 63/302 | 380/270 |
| 10,512,358 | B1 * | 12/2019 | Perrelli | B01F 23/23611 | |
| 10,863,852 | B1 * | 12/2020 | Lyons | B65D 23/14 | |
| 11,758,930 | B1 * | 9/2023 | Pamplin | A23L 2/40 | 426/477 |
| 2011/0215485 | A1 * | 9/2011 | Steinberg | B01F 23/20 | 261/DIG. 7 |
| 2014/0004240 | A1 * | 1/2014 | Hatherell | A23L 2/54 | 426/477 |
| 2014/0004241 | A1 * | 1/2014 | Hatherell | A23L 2/54 | 261/150 |
| 2014/0070431 | A1 * | 3/2014 | Hatherell | B65D 85/73 | 261/37 |
| 2014/0079856 | A1 * | 3/2014 | Hatherell | B67D 1/0406 | 426/477 |
| 2018/0296990 | A1 * | 10/2018 | Yueh | B67D 1/04 | |
| 2019/0015797 | A1 * | 1/2019 | Asis | A23L 2/54 | |
| 2019/0351376 | A1 * | 11/2019 | Yueh | A45F 3/16 | |
| 2020/0197881 | A1 * | 6/2020 | Bergamaschi | A23L 2/00 | |
| 2023/0406611 | A1 * | 12/2023 | Käser | B01F 35/602 | |

FOREIGN PATENT DOCUMENTS

| | | | |
|---|---|---|---|
| CN | 207270263 | U | 4/2018 |
| CN | 208176488 | U | 12/2018 |
| DE | 10 2015 012963 | A1 | 4/2017 |
| EP | 0946273 | B1 | 10/1999 |
| EP | 2279786 | B1 | 10/2012 |
| EP | 3263512 | A1 | 3/2021 |
| GB | 206199 | | 10/2023 |
| WO | 2020/077137 | A1 | 4/2020 |

OTHER PUBLICATIONS

Office Action Search Report for related Australian application No. 2022210042; dated Apr. 7, 2026.

Office Action Search Report for related Chinese application No. CN 202280007169.2; dated Jan. 8, 2026; with English translation.

* cited by examiner 25
24
23

BOTTLE

FIELD OF THE INVENTION

The invention relates to a bottle, in particular a reusable bottle for $CO_2$-containing beverages, which can be carbonated and stored in the bottle.

BACKGROUND

EP 3263512 A1 discloses a container for liquids with an attached carbonation unit. The container comprises a bottle-shaped and closable container body, which has a protuberance in the base that is suitable for receiving a gas cartridge in the form of a single-use cartridge that can be arranged in the carbonation unit. When the container body is placed on the carbonation unit, the gas cartridge is opened by means of a pin and gas flows from the carbonation unit into the container body without pressure reduction. One gas cartridge is required for each filling, but repeated filling with gas without changing the cartridge should also be possible. A concrete solution to this is not disclosed. Optionally, a pressure relief valve can be provided as a safety element.

A comparable device is shown in DE 102015012963 A1, in which a carbonation unit and the liquid container are connected (integrated) to one another in such a way that the liquid container can be filled with liquid without separating it from the carbonation unit. By removing the bottom, the gas storage unit can be accessed from below and replaced, as can a button to trigger the carbonation of the liquid. To do this, however, one must reach around the gas storage unit from below. A possibility for refilling the gas storage unit is not mentioned.

Another device of this type is described in US 2019/0351376 A1, which also includes a closable container and a base part for receiving a gas cartridge. The gas cartridge stands upside down in the bottom part, with a recessed indentation in the container. This causes a significant reduction in the usable volume in the container, which is also more difficult to clean around the indentation. A button to control the gas flow is provided protruding in the bottom of the base part. An option for refilling the gas cartridge is not described here either.

It is also known to place carbonation units in the top part or lid of a bottle, as disclosed for example in EP 2279786 A2, whereas the gas storage tank can again be located inside the bottle (CH 712153 A1).

A complex, transportable system for producing carbonated beverages is disclosed in WO 2020077137 A1. In this case, several interacting containers with additives such as $CO_2$, flavor enhancers or vitamins are arranged in a system container, which also contains a gas tank.

Devices for carbonating tap water at home come in a variety of designs. For example, CN 207270263 U discloses an embodiment in which $CO_2$ is injected directly into the bottle body via the bottom part of a reusable drinking bottle. A similar embodiment is for example also described in EP 0946273 B1. These systems do not offer an option to carbonate water on the go.

SUMMARY OF THE INVENTION

One aspect of the invention related to further improving such a bottle for carbonating and storing drinks and other liquids, in particular a reusable bottle for $CO_2$-containing drinks, while avoiding the disadvantages of the prior art described and particularly providing better usage properties.

The bottle according to the invention comprises a closable liquid container and a gas tank which can be refilled repeatedly. The liquid container is connectable to an adapter which is attached or flanged to the bottom of the liquid container, and which preferably contains a permanently installed $CO_2$ tank.

The $CO_2$ tank in the adapter is refillable. It can also be accessible and interchangeable.

While in the prior art the $CO_2$ for carbonation is obtained from cartridges, mostly single-use cartridges, the gas supply of the bottle according to the invention comes from a refillable gas tank, which is more ecological, more user-friendly, and also cheaper. The costs per bottle filling or per liter of sparkling water can be reduced to approximately ⅕.

With a high quality of the supply of drinking water, the bottle according to the invention can therefore not only be used for commuting or at work, it can then also be used for hiking or cycling tours. In addition, the drinking water or spring water obtained on the go becomes healthier due to the carbonation.

Advantageous embodiments of the invention are also disclosed.

The liquid container is advantageously detachably connected or connectable to the adapter, for example by means of a thread, which facilitates thorough cleaning of the bottle.

However, the liquid container and adapter can also be permanently connected to one another or form a unit.

If desired, other adapters, for example with a UV light or a tea strainer, can be attached or flanged to the liquid container.

The adapter advantageously contains a gas flow regulation valve corresponding with the gas tank and a push button for its operation and a pressure reducer arranged downstream of the gas flow regulation valve. On the one hand, the pressure reducer serves as a safety element since a certain pressure in the liquid container can not be exceeded. And on the other hand, the usability of the bottle according to the invention is increased for the user, because a defined sparkling water strength can be achieved constantly.

The sequence of pressure reducer and gas flow regulation valve can also be reversed. Instead of the pressure reducer, a pressure relief valve can also be arranged downstream of the gas flow regulation valve. In addition, or as an alternative, a mechanism for relieving excess pressure can also be fitted in the bottle lid.

The adapter can also have a non-return valve corresponding with the liquid container (or another piece with a similar function, e.g. a silicone valve) and a non-return valve corresponding with the $CO_2$ tank. The latter for refilling the $CO_2$ tank or gas tank.

Advantageously, the residual pressure in the liquid container can be relieved after the carbonation process via a rotatable closure on the neck of the bottle.

BRIEF DESCRIPTION OF THE DRAWINGS

The invention is described in more detail below in an exemplary embodiment with reference to a drawing. In the drawing

DETAILED DESCRIPTION

A bottle according to the invention (FIG. 1) for providing drinks containing $CO_2$, which are to be carbonated and stored in the bottle, comprises a closable liquid container 1 with an adapter 6 which is flanged to the virtual base 5 of the liquid container 1 and which includes a permanently installed $CO_2$ Tank 11. The liquid container 1 is open towards the bottom and the adapter 6 also forms the bottom 5 of the liquid container 1.

Figure 3:
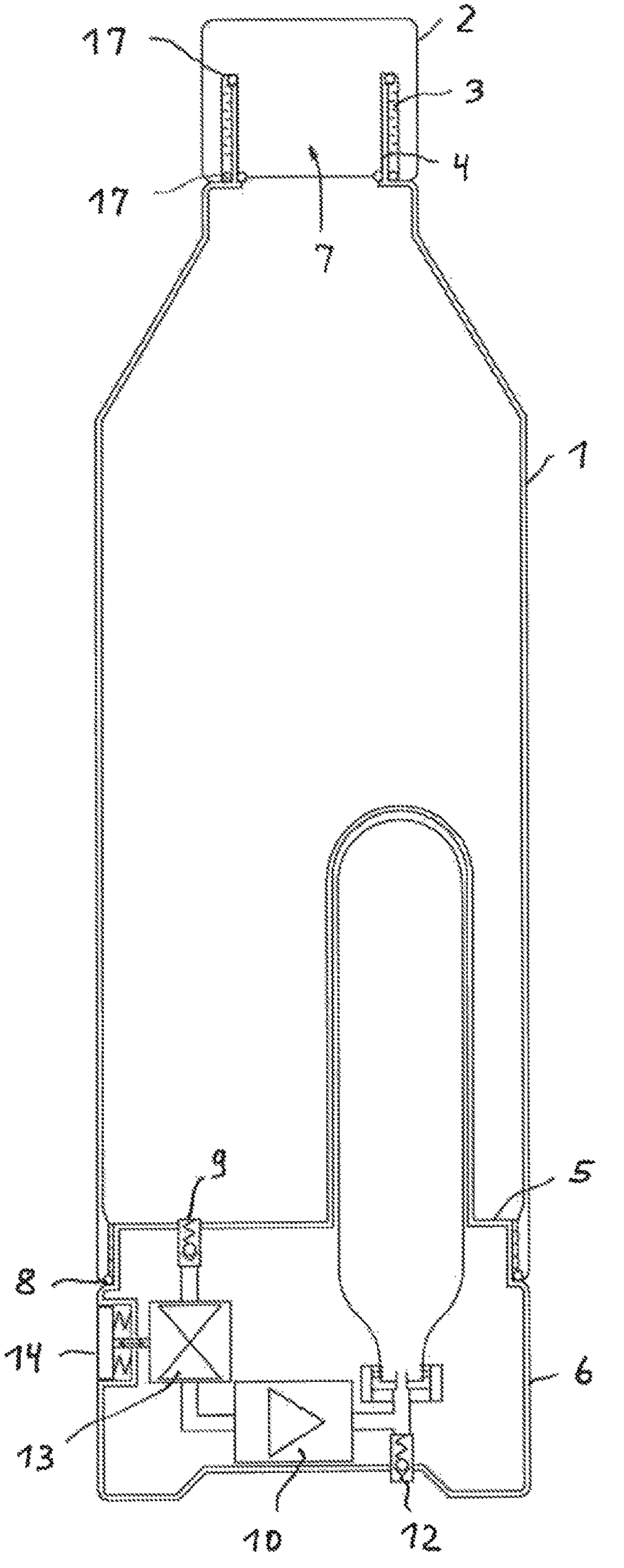
FIG. 3: shows the bottle according to the invention in a second embodiment.

In another embodiment, the $CO_2$ tank 11 could also be reversibly exchangeable, or instead of the $CO_2$ tank 11, a refillable gas cartridge (FIG. 3) could also be installed. To compensate for the lower usable volume of the bottle when using a gas cartridge, the liquid container 1 could then be made longer.

In the example, the liquid container 1 can be closed by means of a rotatable, screwable closure 2 on a bottle neck 7 of the liquid container 1. For this purpose, the bottle neck 7 has an external thread 4 and the closure 2 has an internal thread 3 in the example. In addition, the closure 2 is equipped with a sealing element 17 resting on the bottle neck 7, for example a ring seal or a flat seal.

Figure 1:
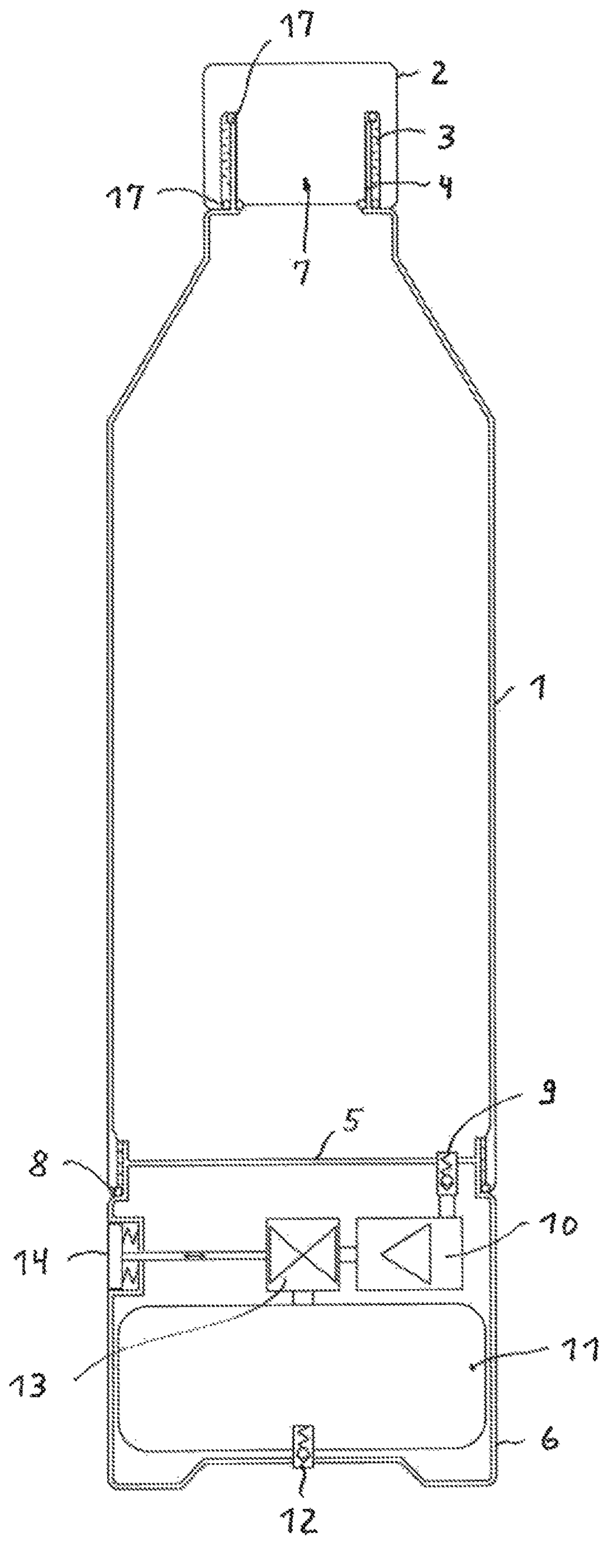
FIG. 1: shows a bottle with an adapter according to the invention.
Figure 2:
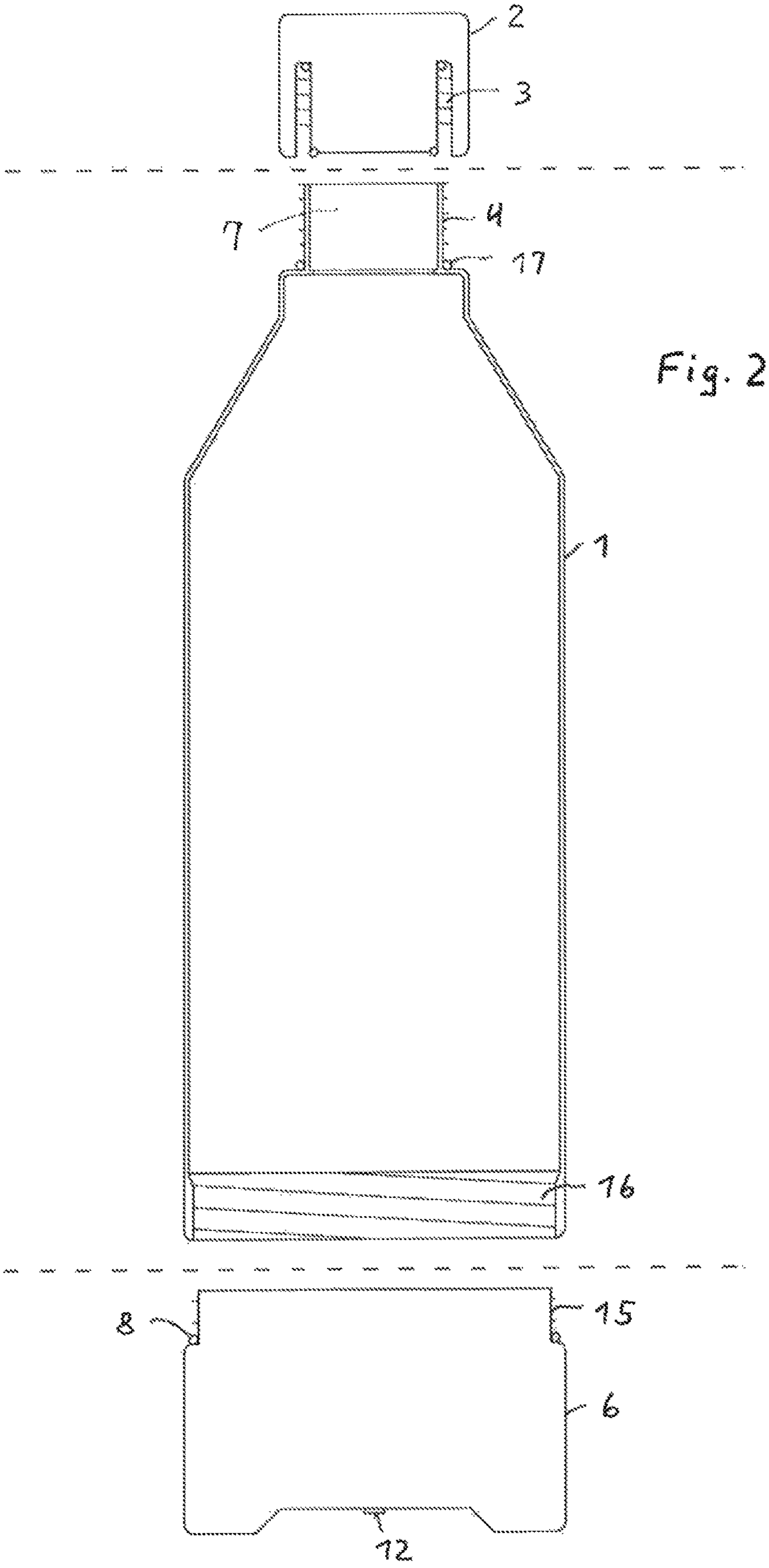
FIG. 2: shows the bottle according to FIG. 1 with the main components separately.

On the bottom 5, the liquid container 1 has an internal thread 16 in the example which can be screwed to an external thread 15 of the adapter 6 (FIG. 1, 2). Analogous to the closure 2, a sealing ring 8 is inserted (FIG. 1, 2).

Instead of the thread 15, 16, other forms of connection are also possible, for example bayonets or similar mechanisms.

The liquid container 1 can be single-walled or double-walled and, like the adapter 6, is preferably made of a light metal, preferably aluminum, or stainless steel, plastic or glass.

Figure 4:
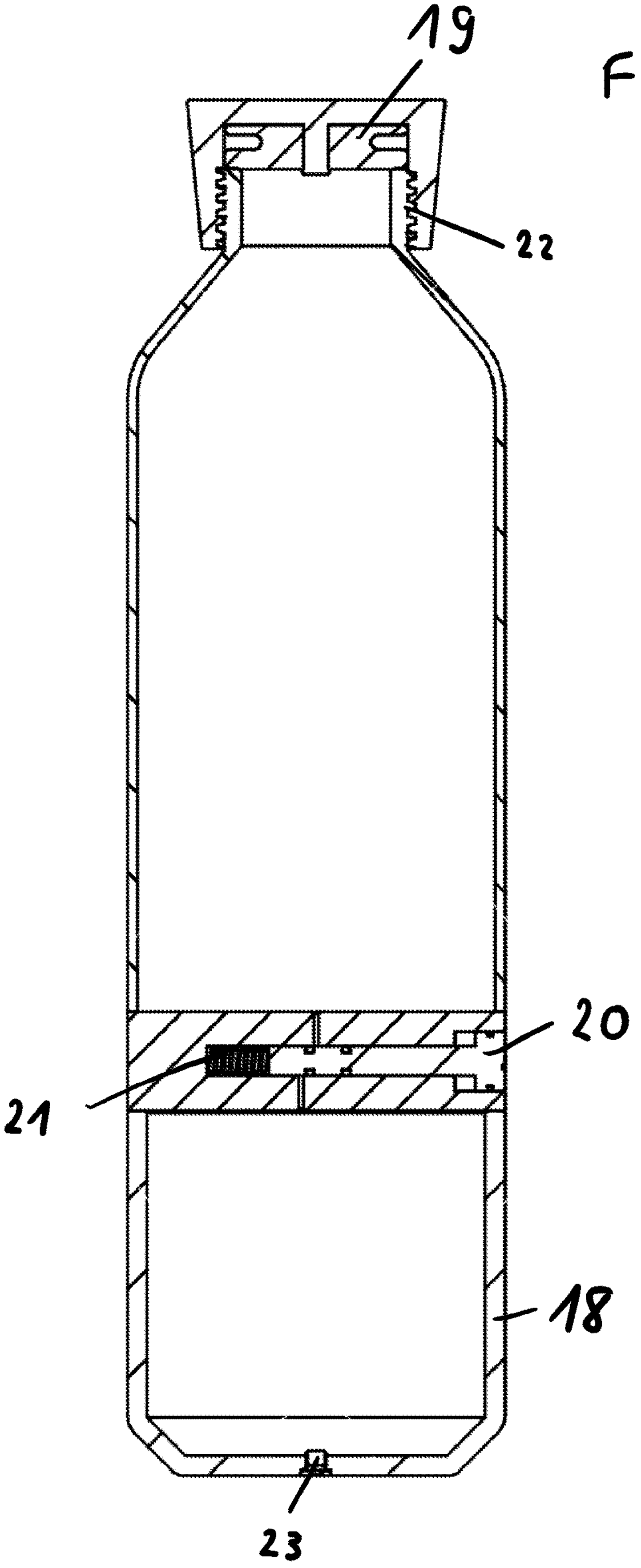
FIG. 4: shows the bottle according to the invention in a third embodiment.

In the example, the $CO_2$ tank 11 is permanently installed in the adapter 6, but can optionally also be designed as a removable tank (e.g. via a screw connection). In both embodiments it is refillable. FIG. 4 additionally shows a possible embodiment in which the adapter case 18 also takes the function of the $CO_2$ storage/tank.

The $CO_2$ or possibly also another food safe gas is discharged from the gas tank 11 into the liquid container 1 in a controlled manner through a gas line/connection. The gas flow is regulated by means of a pressure reducer 10, which can be fitted optionally between the gas tank 11 and the liquid container 1, and a push button 14 coupled to a gas flow regulation valve 13, such that the pressure in the liquid container does not exceed 5-10 bar, for example.

By pressing the push button 14, the mechanical blockage in the gas flow regulation valve 13 is released, whereby the gas flow from the gas tank 11 into the liquid container 1 is made possible.

In order to enable the gas to flow into the liquid or the liquid container 1 without liquid flowing back, a non-return valve 9 or else a silicone valve is preferably arranged as the inlet valve in the adapter 6 close to the base 5. Other embodiments to prevent liquid backflow are possible.

In another embodiment, a "diffuser" can follow downstream of the non-return valve 9 in order to reduce the size of the gas bubbles penetrating into the liquid container 1, which increases the dissolving process of the gas. An improved dissolving process can also be achieved by increasing the residence time of the rising gas bubbles in the liquid by cleverly arranging the gas inlet, e.g. by horizontal instead of vertical alignment.

Figure 5:
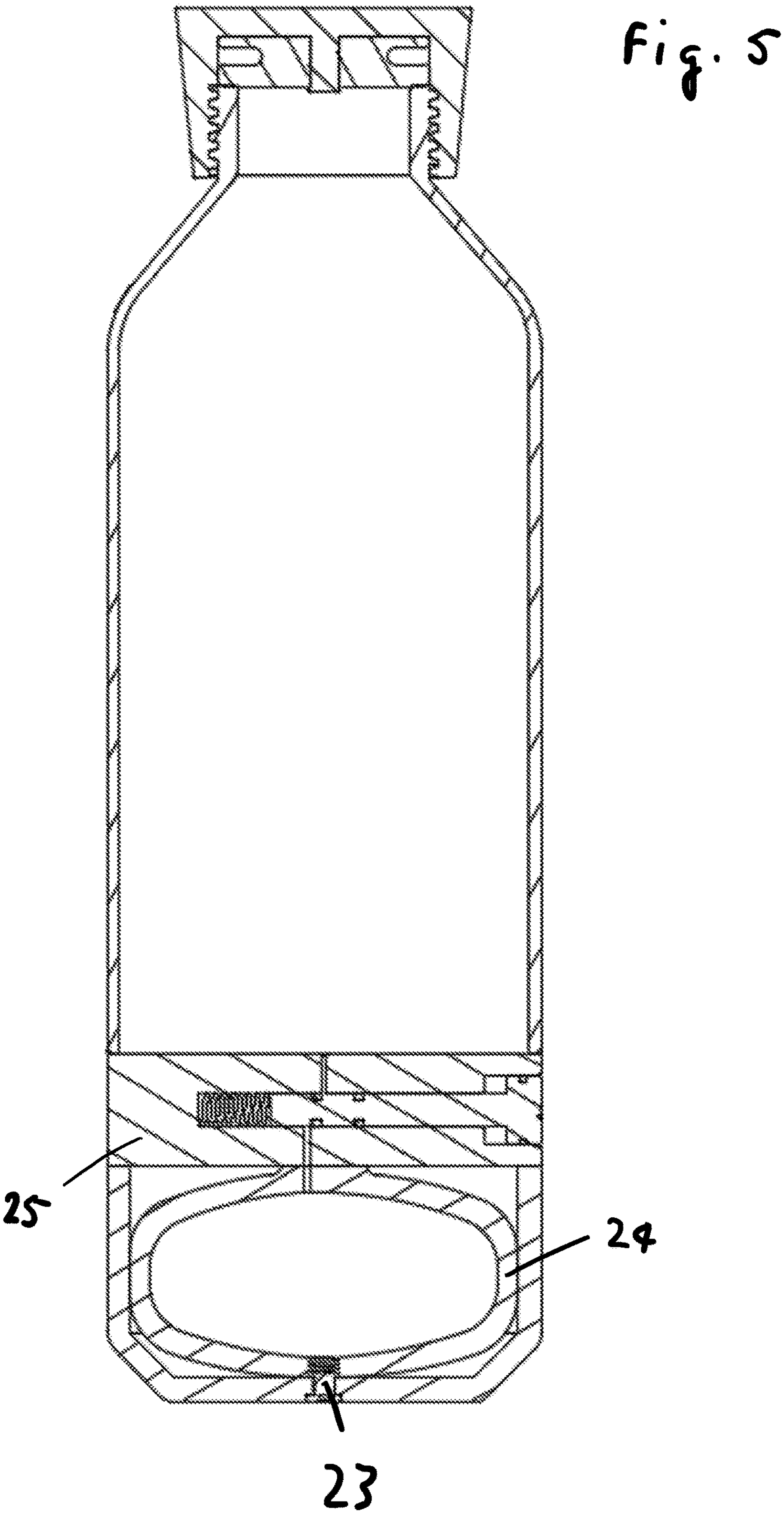
FIG. 5: shows the bottle according to the invention in a fourth embodiment.

As an additional safety element, a pressure relief valve, which has a higher relief pressure than the pressure reducer 10, for example 12 bar, can be arranged between the gas flow regulation valve 13 and the non-return valve 9 functioning as an inlet valve. The pressure reducer 10 can also be replaced by a pressure relief valve. FIGS. 4 and 5 additionally show embodiments in which the sealing element 19 in the bottle lid takes the function of pressure relief. This embodiment can be supplemented with a pressure reducer and/or pressure relief valve and/or predetermined breaking point in the adapter.

The pressure reducer 10 and the mentioned pressure relief units are thus safety elements as well as setting elements in order to achieve a desired sparkling water strength. A short press on the push button 14 produces a drink with a low $CO_2$ content, while a longer press produces a drink with a high $CO_2$ content. In addition, shaking the bottle can accelerate the gas dissolution in the drink, which causes a drop in pressure in the bottle body and allows to feed more gas into the bottle body.

Besides the pressure reducer 10 and the aforementioned relief units, there is another advantageous aspect of functional safety if the pressure built up in the liquid container 1 during the carbonation process can escape quickly when the bottle is opened by unscrewing the closure 2. The closure 2 is thereby not yet completely unscrewed and cannot lift off during the pressure reduction. The pressure reduction can be realized, for example, by means of a groove in the thread.

FIG. 4 shows another possible embodiment of the bottle, with adapter 18 also taking on the function of the $CO_2$ tank. A similar embodiment is shown in FIG. 5, in which, in contrast to FIG. 4, the gas tank 24 represents a separate element. The connection to the adapter case 25 can be made, for example, by means of a screw connection. The push button 20 according to FIG. 4, with the connected gas flow regulation valve, enables the flow of $CO_2$ into the interior of the bottle by the action of force on a mechanical pressure point. In the unactuated position, the regulation valve remains closed by means of a reset mechanism 21, e.g. a spiral spring, and does not allow any flow of $CO_2$ in the flow direction. The sealing element 19 combines a sealing function with a pressure relief function. The sealing function is guaranteed by the shape and the degree of elasticity of the material used. The functional principle corresponds to a conventional elastomer seal (e.g. flat seal, O-ring, etc.). A defined overpressure within the bottle body leads to a change in the geometric shape of the sealing element. This enables a defined overpressure to be released. The excess pressure is discharged via the thread of the bottle neck 22 or through a specially designed opening in the bottle lid. The sealing element can optionally be removed and cleaned manually by the user. Other embodiments of the pressure relief in the lid are possible. A combination with a pressure reducer and/or pressure relief valve and/or predetermined breaking point in the adapter is advantageous from a safety point of view. The safety element in the adapter should have a higher relief pressure, since a pressure relief via a relief unit in the bottle cap is advantageous due to the reduced $CO_2$ concentration.

According to FIG. 1, a non-return valve 12 in the base of the adapter 6 serves as an inlet valve for refilling the gas tank 11. Analogically, the non-return valve 23 in FIG. 4/FIG. 5 serves for refilling the gas storage 18 or the gas tank 24. The refilling station 26/the adapter 31 is external and enables the refilling of the gas tank 11 or 18 or 24 (FIG. 6, 7) via a counterpart that fits the non-return valve 12.

The volume of the gas tank is less than 0,5 I and the pressure in the gas tank is max. 60 bar, such that in combination with a wall thickness of at least 3.5 mm it satisfies the standards EN 7866 and EN 12862. Like the bottle itself, it can be made of a light metal. Other embodiments (shape, wall thickness) of the gas tank and standards to comply with are possible.

In the example described above, all functions are carried out mechanically. Electromechanical functional implementations are possible.

Up to 10 liters of sparkling water can be produced with one tank filling.

Figure 6:
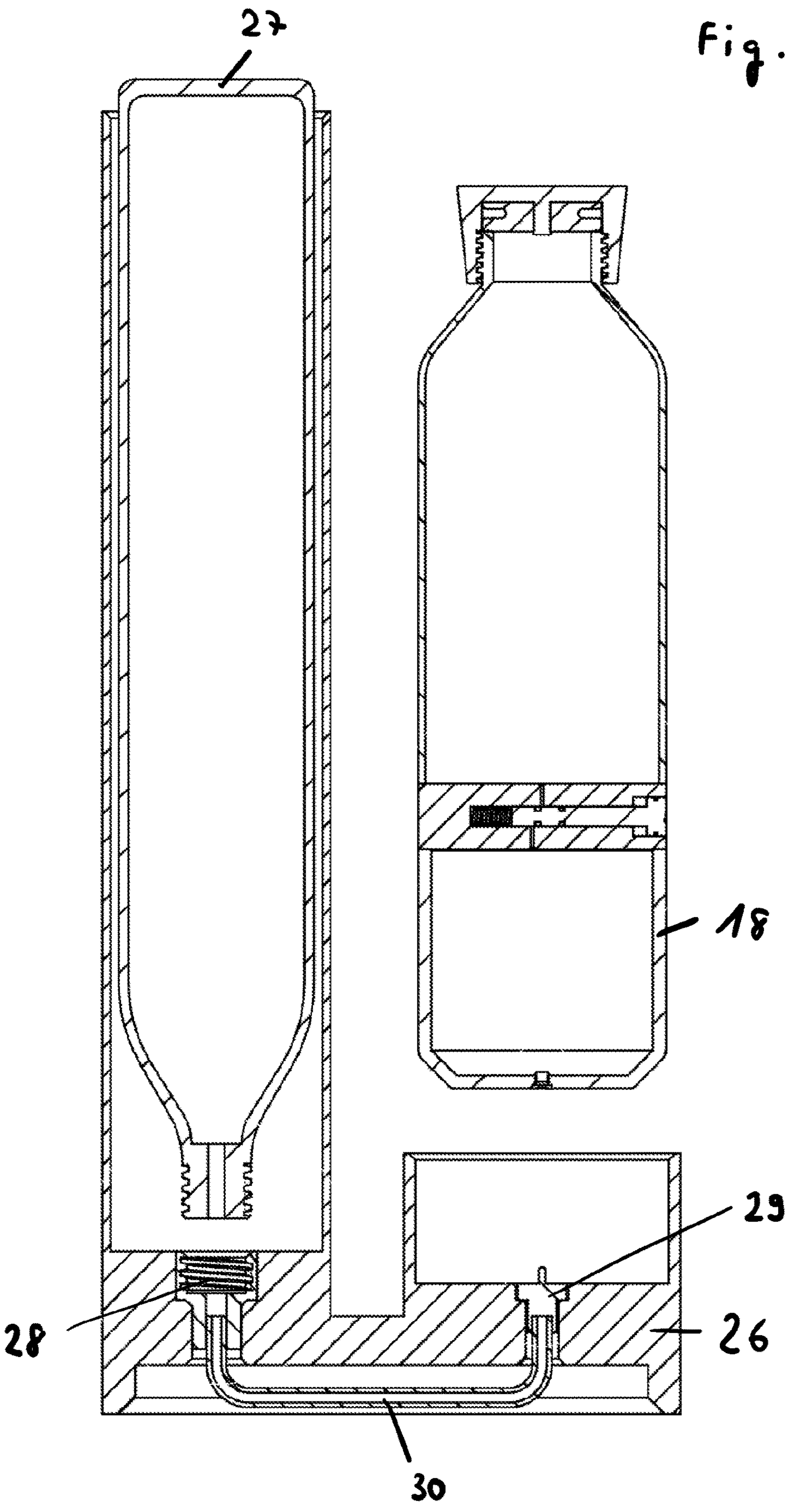
FIG. 6: shows the bottle according to the invention with a device for refilling.

The $CO_2$ tank 11 or 18 or 24 can be repeatedly filled via the non-return valve 12 or 23 and an external refilling station 26 (FIG. 6). The refilling station 26 can be equipped with a larger, commercially available $CO_2$ gas cylinder 27. The connection to the charging station is made using a threaded fitting 28, or a similar mechanism, with a seal to prevent $CO_2$ losses. The connection can be pressureless, i.e. the check valve in the $CO_2$ gas cylinder 27 is actuated manually by the user exerting force, e.g. by pushing down the $CO_2$ gas cylinder or operating an external mechanism (e.g. lever, push button, etc.). Alternatively, a pressurized implementation is possible, i.e. the check valve in the $CO_2$ gas cylinder 27 is automatically actuated when it is connected to the threaded fitting 28. The content and pressure of the $CO_2$ gas cylinder then flows up to the filling and non-return valve 29. When force is applied to a mechanical release mechanism (e.g. pin, ball, plug), the filling and non-return valve 29 allows the gas to flow from the $CO_2$ gas cylinder 27 via a gas line 30 into the adapter and $CO_2$ storage/tank 18. The force is applied by fixing and pressing down the bottle in the refilling station 26. Other forms of force to trigger the gas flow are possible. A pressure reduction/relief to fill the gas tank 11 or 18 or 24 is not necessary since $CO_2$ does not exceed the maximum pressure of 60 bar permitted in the gas tank 11 or 18 or 24 for physical reasons.

Figure 7:
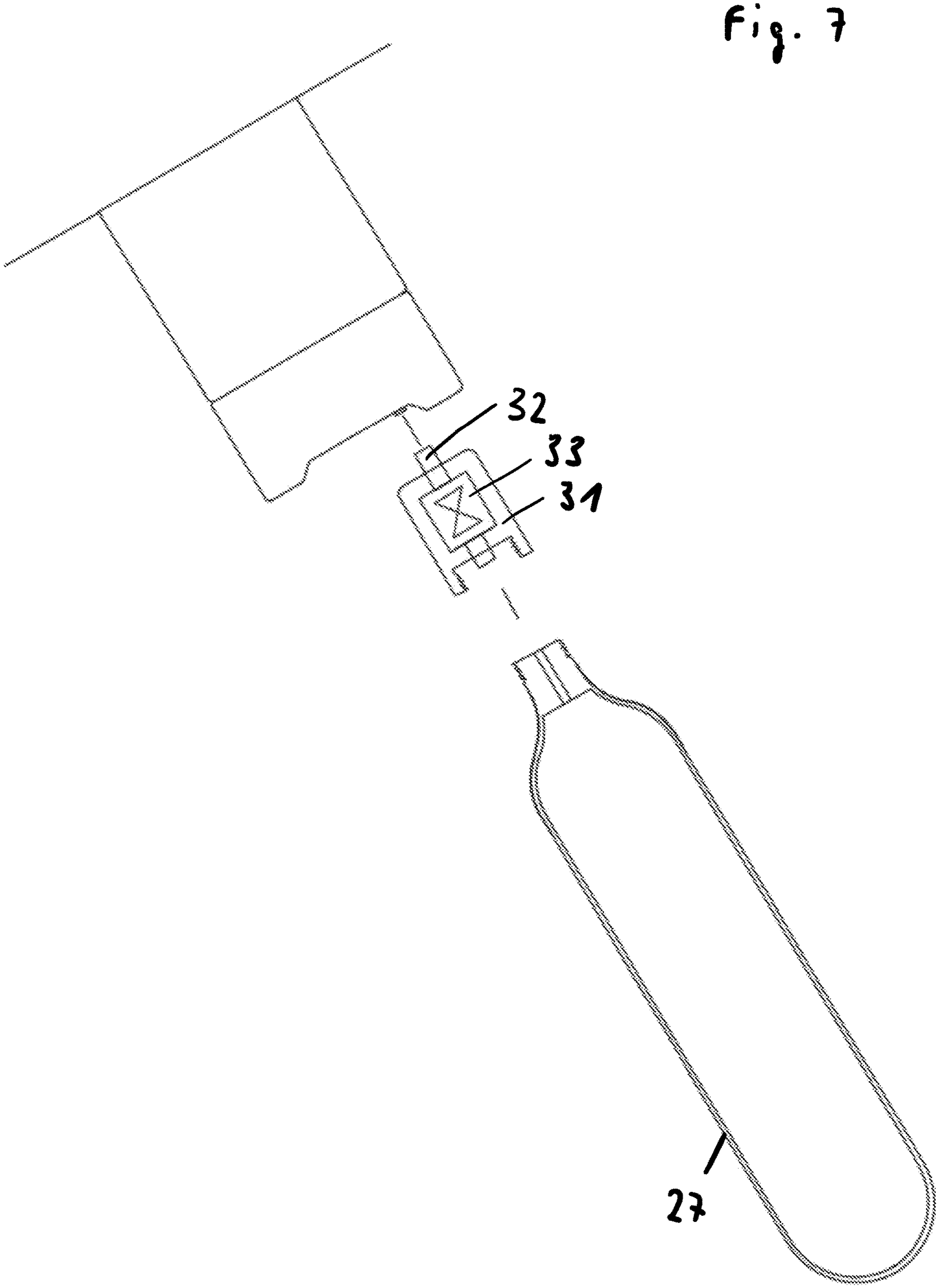
FIG. 7: shows a second embodiment of the refilling.

In another, mobile embodiment of the refilling of the $CO_2$ tank 11 or 18 or 24, an adapter 31 for the large $CO_2$ gas cylinder 27 is provided instead of a refilling station (FIG. 7). The $CO_2$ gas cylinder 27 is for example attached to the adapter 31 via a threaded fitting, the check valve located in the $CO_2$ gas cylinder 27 being actuated automatically (pressurized version). If the needle protruding from the adapter 32 is inserted into the non-return valve 12 of the adapter 6 and pressure is applied, the physical blockage in the gas flow regulation valve 33 is released and the gas flow starts.

LIST OF REFERENCE SIGNS

1 Liquid container
2 Closure
3 Internal thread
4 External thread
5 Virtual base/bottom
6 Adapter
7 Bottle neck
8 Sealing ring
9 Non-return valve
10 Pressure reducer
11 $CO_2$ tank
12 Non-return valve
13 Gas flow regulation valve
14 Push button
15 External thread
16 Internal thread
17 Sealing element
18 Adapter and $CO_2$ storage/tank
19 Sealing element (with pressure relief function)
20 Push button with connected gas flow regulation valve
21 Reset mechanism
22 Thread of the bottle neck
23 Non-return valve
24 $CO_2$ tank
25 Adapter case
26 Refilling station
27 $CO_2$ gas cylinder
28 Threaded fitting
29 Filling and non-return valve
30 Gas line
31 Adapter (as a refilling station)
32 Adapter needle
33 Gas flow regulation valve

The invention claimed is:

1. A bottle for beverages which are carbonated and stored in the bottle, the bottle comprising:
- a closable liquid container; and
- an adapter which is attached or flanged to a base of the liquid container,
- wherein the adapter includes a $CO_2$ tank, or the adapter is suitably designed as a $CO_2$ tank,
- the $CO_2$ tank is designed so to be repeatedly refillable via an external refilling station,
- the adapter includes a non-return valve corresponding with the $CO_2$ tank, the non-return valve being configured as an inlet valve for refilling the $CO_2$ tank, and
- the liquid container is configured to be depressurized via a closure.

2. The bottle according to claim 1, wherein the liquid container and the adapter are detachably connected to one another.

3. The bottle according to claim 1, wherein the liquid container and the adapter are permanently connected to one another or form a unit.

4. The bottle according to claim 1, wherein another adapter is attached or flanged to the liquid container.

5. The bottle according to claim 1, wherein the adapter includes:
- a gas flow regulation valve corresponding with the $CO_2$ tank; and
- a push button coupled to the gas flow regulation valve.

6. The bottle according to claim 1, wherein the adapter includes a second non-return valve corresponding with the liquid container, the second non-return valve being configured to enable $CO_2$ to flow into the liquid container.

7. The bottle according to claim 5, wherein the adapter includes a pressure reducer, the pressure reducer being provided in front of the gas flow regulation valve.

8. The bottle according to claim 1, wherein the closure is a rotatable closure.

9. The bottle according to claim 1, wherein the $CO_2$ tank is permanently installed in the adapter.

10. The bottle according to claim 1, wherein a sealing element in the closure is designed to be suitable for pressure relief.

11. The bottle according to claim 5, wherein the adapter includes:
- a second non-return valve corresponding with the liquid container, the second non-return valve being configured to enable $CO_2$ to flow into the liquid container; and
- a pressure reducer arranged between the gas flow regulation valve and the second non-return valve.

12. The bottle according to claim 1, wherein the $CO_2$ tank is configured to be removable from the adapter, and is configured to be refilled while installed in the adapter via the non-return valve.

13. A bottle for beverages which are carbonated and stored in the bottle, the bottle comprising:
   a closable liquid container;
   a closure configured for closing the liquid container; and
   an adapter which is attached or flanged to a base of the liquid container,
   wherein the adapter includes a $CO_2$ tank, or the adapter is suitably designed as a $CO_2$ tank,
   the $CO_2$ tank is designed so to be repeatedly refillable via an external refilling station,
   the adapter includes a non-return valve corresponding with the $CO_2$ tank, the non-return valve being configured as an inlet valve for refilling the $CO_2$ tank, and
   the closure and the adapter are designed to be suitable for pressure relief.

14. The bottle according to claim 1, wherein the non-return valve is in a base of the adapter.

15. The bottle according to claim 1, wherein the $CO_2$ tank is configured to be refilled while installed in the adapter via the non-return valve and the external refilling station.

16. A bottle for beverages which are carbonated and stored in the bottle, the bottle comprising:
   a closable liquid container;
   a closure configured for closing the liquid container; and
   an adapter which is attached or flanged to a base of the liquid container,
   wherein the adapter includes a $CO_2$ tank, or the adapter is suitably designed as a $CO_2$ tank,
   the adapter includes a non-return valve corresponding with the $CO_2$ tank, the non-return valve being configured as an inlet valve for refilling the $CO_2$ tank,
   the $CO_2$ tank is designed so to be repeatedly refillable via an external refilling station, and
   the closure is designed to be suitable for pressure relief.

17. The bottle according to claim 16, wherein a sealing element in the closure is designed to be suitable for pressure relief.

18. The bottle according to claim 16, wherein the closure and the adapter are designed to be suitable for pressure relief.

19. The bottle according to claim 16, wherein the closure is a rotatable closure.

* * * * *